C. H. & D. C. BRAWLEY.
BULL-WHEELS AND OPERATING-MECHANISMS.
No. 195,697. Patented Oct. 2, 1877.
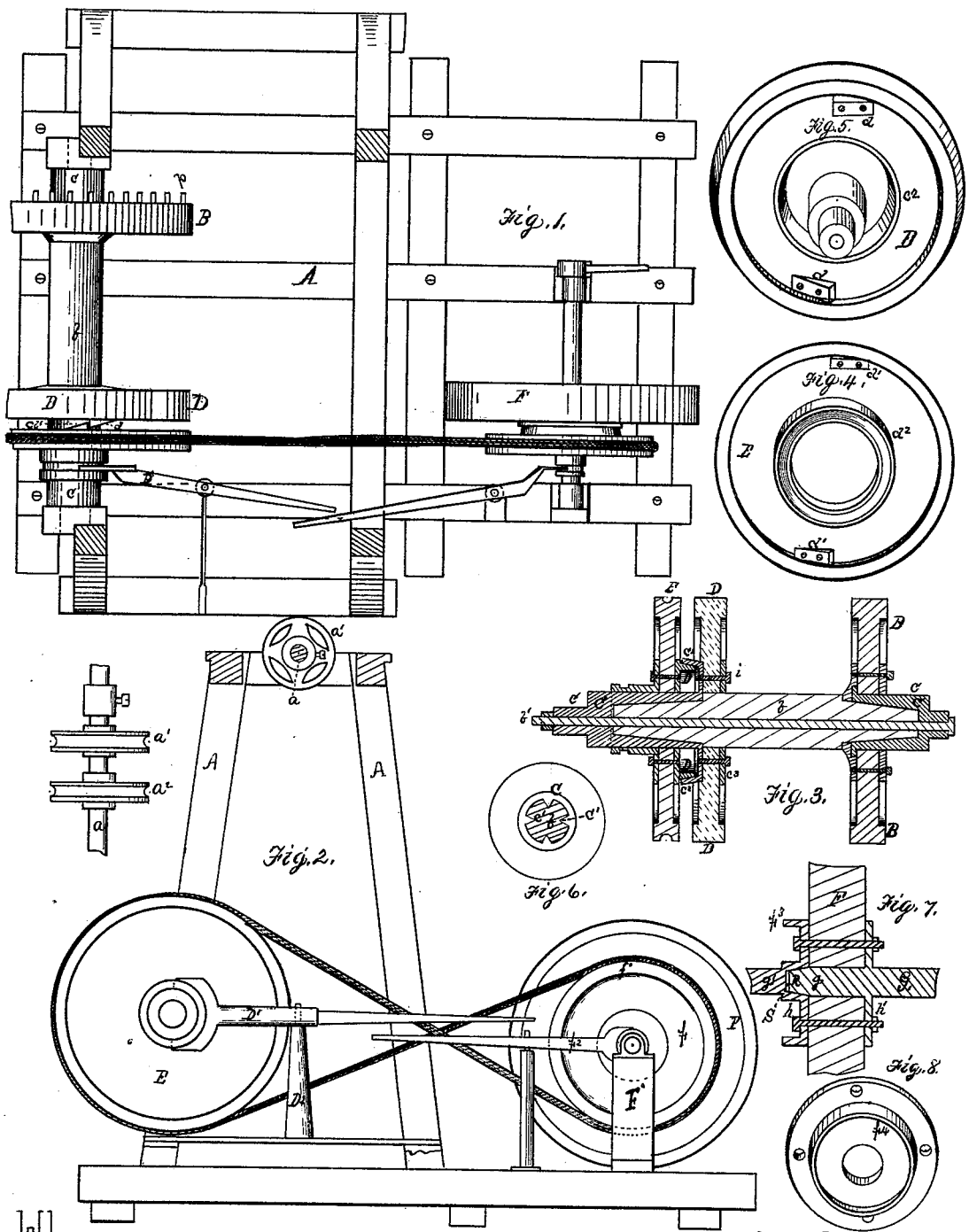

UNITED STATES PATENT OFFICE.

C. HOMER BRAWLEY, OF MEADVILLE, AND DEWITT C. BRAWLEY, OF PETROLIA, PENNSYLVANIA.

IMPROVEMENT IN BULL-WHEELS AND OPERATING MECHANISMS.

Specification forming part of Letters Patent No. 195,697, dated October 2, 1877; application filed July 2, 1877.

*To all whom it may concern:*

Be it known that we, C. HOMER BRAWLEY, of Meadville, Crawford county, Pennsylvania, and DEWITT C. BRAWLEY, of Petrolia, in the county of Butler and State of Pennsylvania, have invented a new and useful Improvement in Bull-Wheels and Mechanism for Operating the Same; and we do hereby declare the following to be a full, clear, and exact description thereof, reference being had to the accompanying drawing, forming part of this specification, in which—

Figure 1 is a plan view of a bull-wheel and mechanism for operating the same, portions of the derrick being broken away. Fig. 2 is a side elevation of the same. Fig. 3 is a longitudinal section of the bull-wheel. Figs. 4 and 5 are detail views, showing the clutch and friction devices of the bull-wheel. Fig. 6 is a transverse sectional view of the gudgeon. Fig. 7 is a sectional view of the band-wheel and its shaft. Fig. 8 is a detached view of the clutch-flange of the band-wheel.

Like letters refer to like parts wherever they occur.

Our invention relates to the construction of bull-wheels (such as are employed in drilling and pumping wells) and to mechanism for operating the same; and consists, first, in forming the gudgeons of separate bull-wheels with a flange or flanges for attaching or connecting the wheels to the gudgeon and shaft; secondly, in journaling the tug-wheels or driving-pulley loosely upon the shaft of the bull-wheel, and providing clutch mechanism therefor; thirdly, in forming the tug-groove of the band-wheel upon an independent pulley or section arranged upon the same shaft and connectable to the band-wheel by clutch mechanism; fourthly, in providing a sectional flanged shaft for the band-wheel; and, finally, in details of construction hereinafter more specifically set forth.

We will now proceed to describe our invention so that others skilled in the art to which it appertains may apply the same.

In the drawings, A represents a derrick, at or near the top of which is journaled a shaft, $a$, upon which are adjustably secured (by set-screws or in other suitable manner) two grooved pulleys, $a^1$ $a^2$, for the reception of the sand-line and drilling-cable. These pulleys we substitute for the blocks heretofore employed, which are objectionable, in that the line and cable frequently become frozen fast in cold weather, delaying the work.

B represents the bull-wheel, having a shaft, $b$, of proper length, tapered at each end for the reception of the gudgeons $c$, and bored for the passage of a bolt-rod, $b'$, which secures the gudgeons to shaft $b$.

C are hollow gudgeons, preferably formed with an interior taper, as shown, corresponding to the taper given to the ends of shaft $b$, and provided with internal ribs, wings, or longitudinal flanges $c^1$, which take into grooves formed in the tapered ends of shaft $b$, thus serving to key the shaft and gudgeon and prevent the turning of the gudgeon upon the shaft.

If preferred, other means may be employed to key the shaft and gudgeon, and prevent one turning upon the other.

In order to secure the wheels D to the gudgeon, the latter is formed with a flange, $c^2$, of sufficient width to brace the wheel and give attachment to bolts $i$, and an annular bolt-ring or washer, $c^3$, is provided for the inner face of the wheel.

The wheels D may be made from plank in the usual manner, and secured to the gudgeons by bolts $i$, in the manner before specified.

When a metallic friction-clutch is desired between the bull-wheel and the independent tug-wheel, this flange $c^2$ is formed cup shape or conical, as shown in the drawing; otherwise it may be a plain flange.

E is an independent pulley, loose upon the shaft of the bull-wheel, and controlled by a forked shifting-lever, $D^1$, pivoted on the standard $D^2$. On the periphery of said pulley, which we term the "tug-wheel," is formed the groove for the tug-rope, and on its side are two or more cam-lugs, $d$, which are adapted to engage with similar lugs $d^1$ secured to the side of that wheel of the bull-wheel which is next to the tug-wheel E. These devices convert the tug-wheel into a positive clutch, which is employed when power is applied; but it is sometimes desirable in taking up the slack of the cable or in lowering the tools, and, under like circumstances, to employ a friction-clutch, and for this purpose we form a cup or hollow cone, $c^2$, as before specified, on one of the gudgeons, and secure a corresponding cone-disk, $d^2$, to the inner side of the tug-wheel E, so that on the reverse motion of the bull-wheel, and also between the engagement of the cams of the positive clutch, a friction-clutch or a friction-brake mechanism, as desired, is obtained. These latter devices, however, may be dispensed with and a friction-clutch likewise obtained by extending the flanged perimeters of the wheels D and E until they meet.

F indicates the band-wheel (or driving-wheel) formed in two sections, $f f^1$; or, in other words, two wheels of approximate diameters, one with a groove for the tug-rope and the other with a square face for the driving-belt, are mounted upon the same shaft, one, $f$, (the belt-section,) being rigidly attached thereto, while the other, $f^1$, (the tug-section,) is loose upon the shaft, and controlled by a forked lever, $f^2$, pivoted on a standard, F'. Secured to or formed on the wheels $f f^1$ are cone and cup friction devices $f^3 f^4$ similar to those with which the wheels E and D are provided, and for like purposes.

The friction-clutch of the band-wheel may be associated with the positive clutch described on the bull-wheel, or the positive clutch may take the place of the friction-clutch.

The shaft G of band-wheel F is constructed in two sections, $g g'$, each of which is provided with a flange, $h h'$, for securing the band-wheel, and in order to align the sections the socket S is formed in the one section to receive a peg, R, or prolongation of the shaft on the other section, said socket being of sufficient depth to permit of the drawing together of the flanges $h h'$ as the lumber of the wheel shrinks.

The band-wheel may be made from plank in the usual manner, is provided with a central hole for the passage of peg R, and is then firmly bolted between the flanges $h h'$, as indicated.

The brace-flange, which forms the cup or friction-clutch of the band-wheel, may be cast separate, as shown in Fig. 8, and keyed to the shaft in the manner at present practiced in constructing band-wheels.

The bull-wheel may be provided with the usual side pins $p$ and the ordinary brake.

The above constitute our devices, which are employed as follows: The bull-wheel having been set up by securing the wheels D to the gudgeons by means of the flanges $c^2 c^3$, and the gudgeons to the shaft by rod or bolt $b'$, the combined tug-wheel and clutch is slipped loosely on the gudgeon, and the whole suitably journaled in the derrick. The band-wheel, constructed as specified, is mounted in suitable bearings, and the belt from power-shaft is adjusted, after which the tug-rope is passed from the tug-section of the band-wheel to the tug-wheel on the shaft of the bull-wheel.

When it is desired to operate the bull-wheel, the tug-section is forced by its lever or in other suitable manner against the band-wheel, and the tug-wheel by its lever against the wheel D. If the lugs $d$ have passed $d^1$ the friction-clutch will operate (to take up slack and for like purposes) until such time as the wheels D and E are positioned for the lugs to engage, when the positive clutch of the bull-wheel will operate.

Should the motion of the bull-wheel be arrested (by the sticking of the tools in the well or otherwise) the tug-rope will slip, thus avoiding injury to the machinery which might otherwise occur with positive clutches.

The bull-wheel may be stopped and started at pleasure by unshipping one or both of the clutch mechanisms.

Among the advantages arising from our invention are, first, that the construction of a separable bull-wheel is simplified and cheapened; secondly, that the bull-wheel can be stopped and started readily, and without the labor and danger now incident thereto; and, finally, that the expense and labor of constructing and maintaining band-wheels are materially reduced, and a stronger and better wheel obtained.

We are aware of the invention set forth in the application of W. H. H. Morris, of even date herewith, and do not claim such subject-matter; but

Having thus described our invention, what we claim, and desire to secure by Letters Patent, is—

1. The hollow externally-flanged gudgeon for separable bull-wheels, substantially as specified.

2. The hollow gudgeon having the external flange and the internal ribs, substantially as and for the purpose specified.

3. In combination with a bull-wheel, the clutch tug-wheel loosely mounted on the shaft or gudgeon of the bull-wheel, substantially as and for the purpose specified.

4. The combination, in a bull-wheel, of the shaft and wheel $b$ D, with the independent tug-wheel mounted on the gudgeon of the bull-wheel, and the positive and friction-clutch mechanism arranged on the tug-wheel and wheel D, substantially as and for the purpose specified.

5. The combination, with a bull-wheel, of the band-wheel having the independent tug section and clutch, substantially as and for the purpose specified.

6. The bull-wheel having the independent tug-wheel and clutch mechanism, in combination with the band-wheel having the independent tug-section and clutch mechanism, substantially as and for the purpose specified.

7. The sectional flanged band-wheel shaft, substantially as and for the purpose specified.

8. The frictional clutch-flange for band-wheel shafts, substantially as specified.

In testimony whereof we, the said C. HOMER BRAWLEY and DEWITT C. BRAWLEY, have hereunto set our hands.

C. HOMER BRAWLEY.
DEWITT C. BRAWLEY.

Witnesses:
JOHN K. SMITH,
F. W. RITTER, Jr.